(12) United States Patent
Smith et al.

(10) Patent No.: US 11,089,482 B2
(45) Date of Patent: Aug. 10, 2021

(54) SYSTEM AND METHOD FOR CORRELATING DIVERSE LOCATION DATA FOR DATA SECURITY

(71) Applicant: Visa International Service Association, San Francisco, CA (US)

(72) Inventors: Eden Smith, San Francisco, CA (US); Mary Reeder, Seattle, WA (US); Joseph Bureau, Maple Valley, WA (US); Frederick Liu, Oakland, CA (US)

(73) Assignee: Visa International Service Association, San Francisco, CA (US)

(*) Notice: Subject to any disclaimer, the term of this patent is extended or adjusted under 35 U.S.C. 154(b) by 23 days.

(21) Appl. No.: 16/074,379

(22) PCT Filed: Mar. 31, 2017

(86) PCT No.: PCT/US2017/025366
§ 371 (c)(1),
(2) Date: Jul. 31, 2018

(87) PCT Pub. No.: WO2017/173263
PCT Pub. Date: Oct. 5, 2017

(65) Prior Publication Data
US 2020/0186997 A1    Jun. 11, 2020

Related U.S. Application Data

(60) Provisional application No. 62/315,846, filed on Mar. 31, 2016.

(51) Int. Cl.
*H04L 29/06*    (2006.01)
*H04W 12/63*    (2021.01)
*H04W 12/06*    (2021.01)

(52) U.S. Cl.
CPC ........... *H04W 12/63* (2021.01); *H04W 12/06* (2013.01)

(58) Field of Classification Search
CPC ....... H04W 12/63; H04W 12/06; H04W 4/02; G06Q 20/3224; G06Q 20/3278;
(Continued)

(56) References Cited

U.S. PATENT DOCUMENTS 7,082,409 B1 *    7/2006    Cherry .................... G06Q 30/02
                                                    705/27.1
2006/0271531 A1 *    11/2006    O'Clair .............. G06Q 30/0205
(Continued)

FOREIGN PATENT DOCUMENTS

CN            1431604        7/2003
CN            101490704      7/2009
(Continued)

OTHER PUBLICATIONS

EP17776771.2 , "Office Action", dated Oct. 8, 2019, 10 pages.
(Continued)

*Primary Examiner* — Taghi T Arani
*Assistant Examiner* — Lin Chang
(74) *Attorney, Agent, or Firm* — Kilpatrick Townsend & Stockton LLP

(57) ABSTRACT

A method for authentication using location correlation is disclosed. The method includes determining geographic zones and zone identifiers associated with a location of a mobile communication device. Later, transaction data is received and a zone identifier is determined from that transaction data. If the zone identifier matches one of the previously determined zone identifiers, then a match indicator is sent to an authorizing entity computer system or the transaction may be allowed to proceed.

18 Claims, 9 Drawing Sheets

(58) Field of Classification Search
CPC .... G06Q 20/202; G06Q 20/401; H04L 67/18; H04L 67/04; H04L 63/08
See application file for complete search history.

(56) References Cited

U.S. PATENT DOCUMENTS

| | | | |
|---|---|---|---|
| 2009/0017840 A1* | 1/2009 | Camp, Jr. | H04M 3/42348 455/456.3 |
| 2009/0187492 A1* | 7/2009 | Hammad | G06Q 40/128 705/26.1 |
| 2010/0022254 A1 | 1/2010 | Ashfield et al. | |
| 2011/0154447 A1 | 6/2011 | Dennis et al. | |
| 2011/0202407 A1 | 8/2011 | Buhrmann et al. | |
| 2011/0296453 A1* | 12/2011 | Srinivasan | H04N 21/2668 725/13 |
| 2012/0064920 A1* | 3/2012 | Shaw | H04W 4/02 455/456.4 |
| 2012/0130898 A1 | 5/2012 | Snyder et al. | |
| 2012/0131121 A1 | 5/2012 | Snyder et al. | |
| 2012/0144498 A1 | 6/2012 | Buhrmann et al. | |
| 2012/0177010 A1* | 7/2012 | Huang | H04W 4/021 370/335 |
| 2013/0030934 A1* | 1/2013 | Bakshi | G06Q 20/425 705/18 |
| 2013/0197998 A1 | 8/2013 | Buhrmann et al. | |
| 2014/0290424 A1 | 10/2014 | Kwon | |
| 2014/0351899 A1 | 11/2014 | Dennis et al. | |
| 2014/0380424 A1 | 12/2014 | Thompson | |
| 2015/0017947 A1 | 1/2015 | Ferguson et al. | |
| 2015/0142623 A1 | 5/2015 | Ferguson et al. | |
| 2015/0170135 A1 | 6/2015 | Fourez | |
| 2015/0178715 A1 | 6/2015 | Buhrmann et al. | |
| 2015/0186891 A1 | 7/2015 | Wagner et al. | |
| 2016/0026779 A1 | 1/2016 | Grigg et al. | |
| 2016/0253707 A1* | 9/2016 | Momin | G01C 21/34 705/14.54 |

FOREIGN PATENT DOCUMENTS

| | | |
|---|---|---|
| CN | 105450617 | 3/2016 |
| WO | 2009094433 | 7/2009 |

OTHER PUBLICATIONS

Supplementary European Search Report, dated Feb. 19, 2019, in European Application No. 17776771.2, 11 pages.
International Search Report and Written Opinion, dated Jul. 17, 2017, in PCT Application No. PCT/US17/025366, 8 pages.
CN201780019935.6, "Office Action", dated Oct. 9, 2020, 20 pages.
EP17776771.2, "Notice of Decision to Grant", dated Sep. 17, 2020, 2 pages.

* cited by examiner

SYSTEM AND METHOD FOR CORRELATING DIVERSE LOCATION DATA FOR DATA SECURITY

CROSS REFERENCE TO RELATED APPLICATIONS

This application is a National Stage of International Application No. PCT/US2017/025366 filed Mar. 31, 2017, and claims the benefit of the filing date of U.S. Provisional Application No. 62/315,846, filed on Mar. 31, 2016, of which are all herein incorporated by reference in their entirety for all purposes.

BACKGROUND

Various systems have been created to analyze the location of a user's mobile communication device, relative to a transaction location (e.g., when a user attempts to make a retail purchase). The location where the transaction occurred (e.g., a physical address) can be converted to geo-coordinates (e.g., latitude and longitude) and compared to the geo-coordinates of the user's mobile communication device. If the location of the mobile communication device is within a predetermined distance of the location of the transaction, then the user's attempt to conduct the transaction may be deemed authentic. If it is not, then it is deemed suspicious.

A problem that exists with respect to existing systems that wish to perform such location authentication processes is that converting the location of the transaction (e.g. physical address) into geo-coordinates in order to determine if the location of the mobile communication device is within a predetermined distance of the transaction exceeds processing time constraints. Alternatively, using a predetermined distance to determine authenticity does not take into account that the accuracy of geo-coordinates of mobile communication devices may be based on the density of mobile network access points (e.g. cell towers). In the former case, the location authentication system may not work at all. In the latter case, the accuracy of the results may be negatively impacted.

Embodiments of the invention address these and other problems individually and collectively.

SUMMARY

Embodiments of the invention are directed to methods and systems that can provide for improved data security.

One embodiment of the invention is directed to a method comprising: a) determining, by a computer, a geographic location of a mobile communication device; b) determining, by the computer, a boundary function using the geographic location; c) determining, by the computer, a plurality of pre-defined geographic zones overlapping the boundary function, the plurality of pre-defined geographic zones respectively associated with a plurality of pre-defined geographic zone identifiers; d) receiving, by the computer, transaction data and determining a pre-defined geographic zone identifier for a pre-defined geographic zone from the transaction data; e) determining, by the computer, that the pre-defined geographic zone identifier matches one of the plurality of pre-defined geographic zone identifiers; and f) in response to step e), providing a match indicator to an authorizing entity computer or authorizing the transaction to proceed. In some embodiments, the pre-defined geographic zone identifier may be determined by extracting it from the transaction data. In other cases, the pre-defined geographic zone identifier may be determined using other data (e.g., a street address) in the transaction data.

Another embodiment of the invention is directed to a computer programmed to perform the above-noted method.

Another embodiment of the invention is directed to a method comprising: transmitting, by a mobile communication device operated by a user, data representing a geographic location of the mobile communication device to a computer. The computer determines a boundary function using the geographic location, and determines a plurality of pre-defined geographic zones overlapping the boundary function. The plurality of pre-defined geographic zones are respectively associated with a plurality of pre-defined geographic zone identifiers. The method also comprises a portable user device interacting with an access device in a transaction. The access device generates and transmits an authorization request message comprising transaction data to the computer. The computer determines a pre-defined geographic zone identifier for a pre-defined geographic zone from the transaction data. The computer determines that the pre-defined geographic zone identifier from the transaction data matches one of the plurality of pre-defined geographic zones identifiers determined from the geographic location of the mobile communication device, and authorizes the transaction to proceed, or provides a match indicator to an authorizing entity computer system.

Further details regarding embodiments of the invention can be found in the Detailed Description and the Figures.

DETAILED DESCRIPTION

Figure 1:
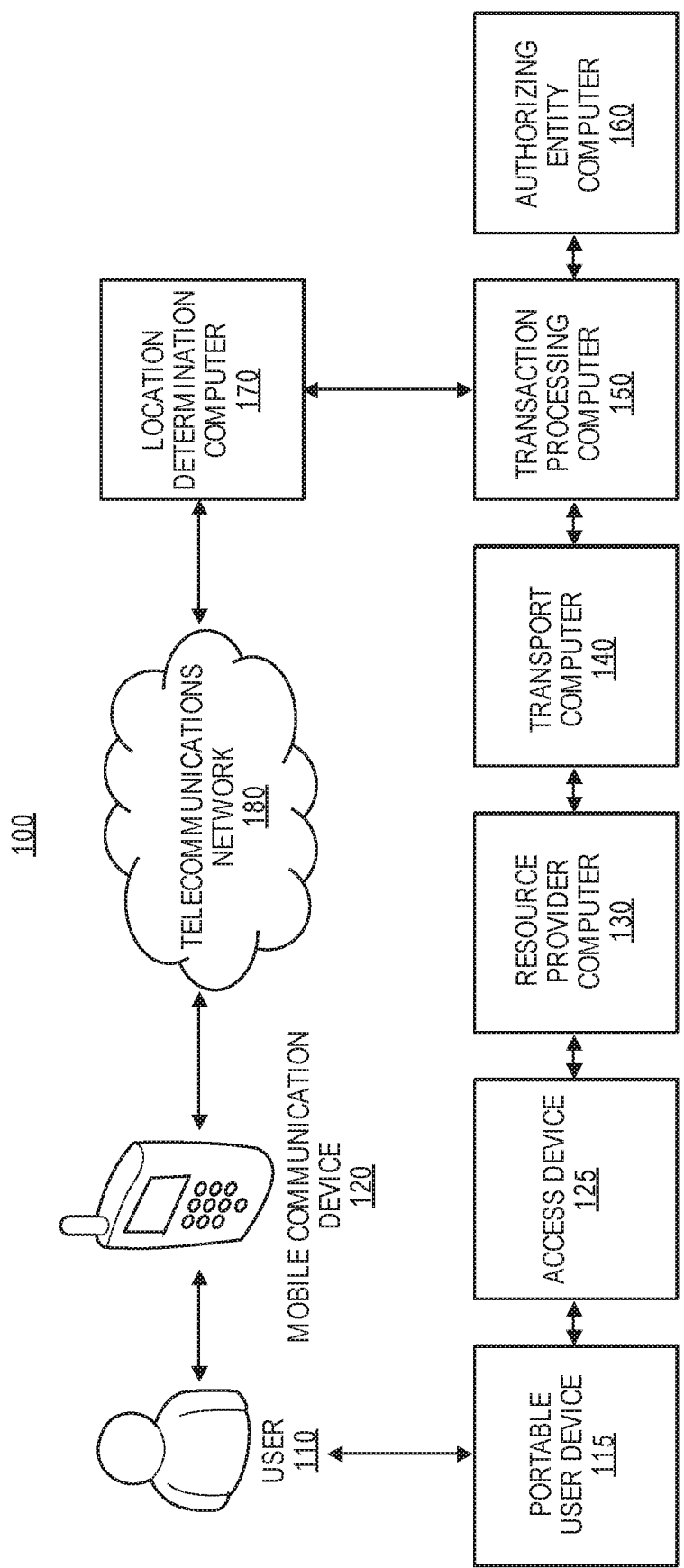
FIG. 1 shows a block diagram of a system according to an embodiment of the invention. The system can be used to process a payment transaction.

Embodiments of the present invention are directed to methods and systems that can utilize a boundary function to determine overlapping predetermined geographic zones that are located proximate to a user's location as determined by a location of the user's mobile communication device. Each predetermined geographic zone can have an identifier associated with it. For example, the identifier may be a postal code and the geographic zone may be a region defined by the postal code. Once the overlapping geographic zones are determined, a transaction request may be received. The transaction request may include an identifier for a geographic location (e.g., a postal code) of a location where the transaction is occurring. Alternatively, the identifier can be determined from the transaction data. This identifier may then be compared with the plurality of predetermined geographic zone identifiers. If the identifier in the transaction request matches one of the plurality of predetermined geographic zone identifiers, then the transaction can be deemed as being authentic or likely authentic. If not, then the transaction may be deemed higher risk.

Prior to discussing specific embodiments of the invention, some terms may be described in detail.

A "mobile communication device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks); Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "portable user device" can include any suitable device that is used by a user and that can be easily carried by the user. Portable user devices may be in the form of phones, cards, wearable devices, vehicles, tablets, laptop computers, etc.

A "payment device" may be an example of a "portable user device" and may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A payment device may be used to make a payment transaction. Suitable payment devices can be hand-held and compact so that they can fit into a users wallet and/or pocket (e.g., pocket-sized). Example payment devices may include smart cards, magnetic stripe cards, keychain devices (such as the Speedpass™ commercially available from Exxon-Mobil Corp.), etc. Other examples of portable user devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile communication device can function as a payment device (e.g., a mobile communication device can store and be able to transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

"Payment credentials" may include any suitable information associated with an account (e.g., a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile communication device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "user" may include an individual. In some embodiments, a user may be associated with one or more personal accounts and/or mobile communication devices. The user may also be referred to as a cardholder, account holder, or consumer.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a 'transport computer'.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a portable user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile communication device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "boundary function" may be a function that serves to separate one geographic area from another. Suitable boundary functions may be in any suitable shape including circles, squares, polygons, etc. They may be regular or irregular in shape. Boundary functions may also be determined using a particular location of a mobile communication device. For example, a particular location of a mobile communication device may be a centroid of a circle that has a radius of 1 mile, and the circle may be the boundary function.

A "pre-defined geographic zone" may include a geographic area that has a predetermined shape. The predetermined shape can be of any suitable size or configuration. An area of land that defines a particular postal code can be a pre-defined geographic zone.

A "pre-defined geographic zone identifier" may include an indicator of a pre-defined geographic zone. The identifier may include any suitable combination of characters. Postal codes, county or city names, and other identifiers may be pre-defined geographic zone identifiers.

FIG. 1 shows a system 100 comprising a number of components. The system 100 comprises a portable user device 115 which may be associated with a user 110 and may be able to provide payment credentials or other access credentials to an access device 125. The access device 125 may be associated with and in communication with a resource provider computer 130. The user 110 may also operate a mobile communication device 120.

The resource provider computer 130, a transport computer 140, a transaction processing computer 150, an authorizing entity computer 160, and/or a location determination computer 170 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like.

Although the location determination computer 170 is being shown as a separate entity in FIG. 1, it is understood that in other embodiments, the functionality of the location determination computer 170 may be incorporated as software modules and/or hardware in the transaction processing computer 150 or even the authorizing entity computer 160 in other embodiments. Thus, in some embodiments, the location determination computer 170, the transaction processing computer 150, and/or the authorizing entity computer 150 could be characterized as a single computer with the functionality described in computers 150, 160, 170.

The mobile communication device 120 may be in communication with the location determination computer 170 through a telecommunications network 180.

The user 110 may be in possession of the mobile communication device 120 and can use the portable user device 115 to conduct transactions with a resource provider associated with the resource provider computer 130. The portable user device 115 may store information associated with the user 110 and/or a payment account. For example, the portable user device 115 may store payment credentials as well as personal information such as a name, address, email address, phone number, or any other suitable user 110 identification information. The portable user device 115 may provide this information to the access device 125 during a transaction.

Authorization requests submitted by the resource provider computer 130 or the access device 125 may be sent to the transport computer 140 (which may be an acquirer computer). The transport computer 140 may be associated with the resource provider computer 130, and may manage authorization requests on behalf of the resource provider computer 130.

As shown in FIG. 1, the transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 150 may use any suitable wired or wireless network, including the Internet.

The authorizing entity computer 160 may issue and manage a payment account and an associated portable user device 115 of the user 110. The authorizing entity computer 160 may be able authorize transactions that involve the payment account. Before authorizing a transaction, the authorizing entity computer 160 may authenticate payment credentials received in the authorization request and check that there is available credit or funds in an associated payment account. The authorizing entity computer 160 may also receive and/or determine a risk level associated with the transaction, and may weigh the risk when deciding whether or not to authorize the transaction. If the authorizing entity computer 160 receives an authorization request that includes a payment token, the authorizing entity computer 160 may be able to de-tokenize the payment token in order to obtain the associated payment credentials.

Figure 2:
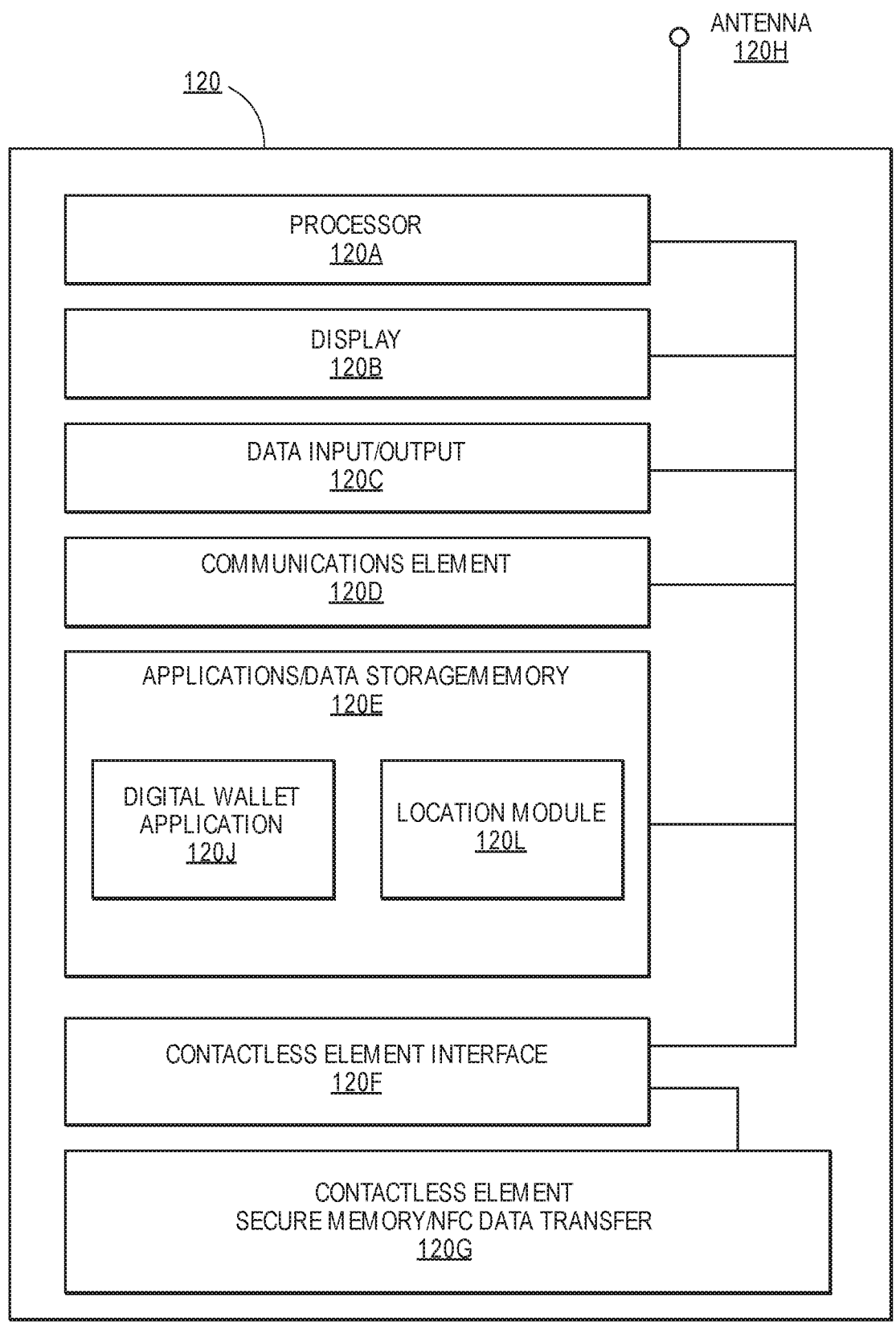
FIG. 2 shows a block diagram of an exemplary mobile communication device according to an embodiment of the invention.

An example of the mobile communication device 120 is shown in FIG. 2. Mobile communication device 120 may include circuitry that is used to enable certain device functions, such as telephony. The functional elements responsible for enabling those functions may include a processor 120A that can execute instructions that implement the functions and operations of the device. Processor 120A may access memory 120E (or another suitable data storage region or element) to retrieve instructions or data used in executing the instructions. Data input/output elements 120C, such as a keyboard or touchscreen, may be used to enable a user to operate the mobile communication device 120 and input data (e.g., user authentication data). Data input/output elements may also be configured to output data (via a speaker, for example). Display 120B may also be used to output data to a user. Communications element 120D may be used to enable data transfer between mobile communication device 120 and a wired or wireless network (via antenna 120H, for example) to assist in connectivity to the Internet or other network, and enabling data transfer functions. Mobile communication device 120 may also include contactless element interface 120F to enable data transfer between contactless element 120G and other elements of the device, where contactless element 120G may include a secure memory and a near field communications data transfer element (or another form of short range communications technology). As noted, a cellular phone or similar device is an example of a mobile communication device 120 that may be used in accordance with embodiments of the present invention. However, other forms or types of devices may be used without departing from the underlying concepts of the invention. For example, the mobile communication device 120 may alternatively be in the form of a payment card, a key fob, a tablet computer, a wearable device, etc.

The memory 120E may comprise a digital wallet application 120J, a location module 120L, and any other suitable module or data.

The digital wallet application 120J may provide a user interface for a user to provide input and initiate, facilitate, and manage transactions using the mobile communication device 120. The digital wallet application 120J may be able to store and/or access a payment token and/or payment credentials. The digital wallet application 120J may also store an issuer-specific key, or any other suitable encryption means. The digital wallet application 120J may be able to cause the mobile communication device 120 to transmit the payment token and/or payment credentials in any suitable manner (e.g., NFC, QR code, etc.).

The location module 120L may be programmed to provide any location data (e.g., GPS data, cell site data, WiFi access point data, etc.) that can be used by the location determination computer 170 to determine the plurality of pre-defined geographic zones of the mobile communication device 120. The location module 120L may be programmed to provide the location data on an event-driven basis (e.g. when mobile communication device switches cell towers), at regular intervals and periodically (e.g., every hour) or upon the request of an external server computer such as the previously described location determination computer.

Figure 3:
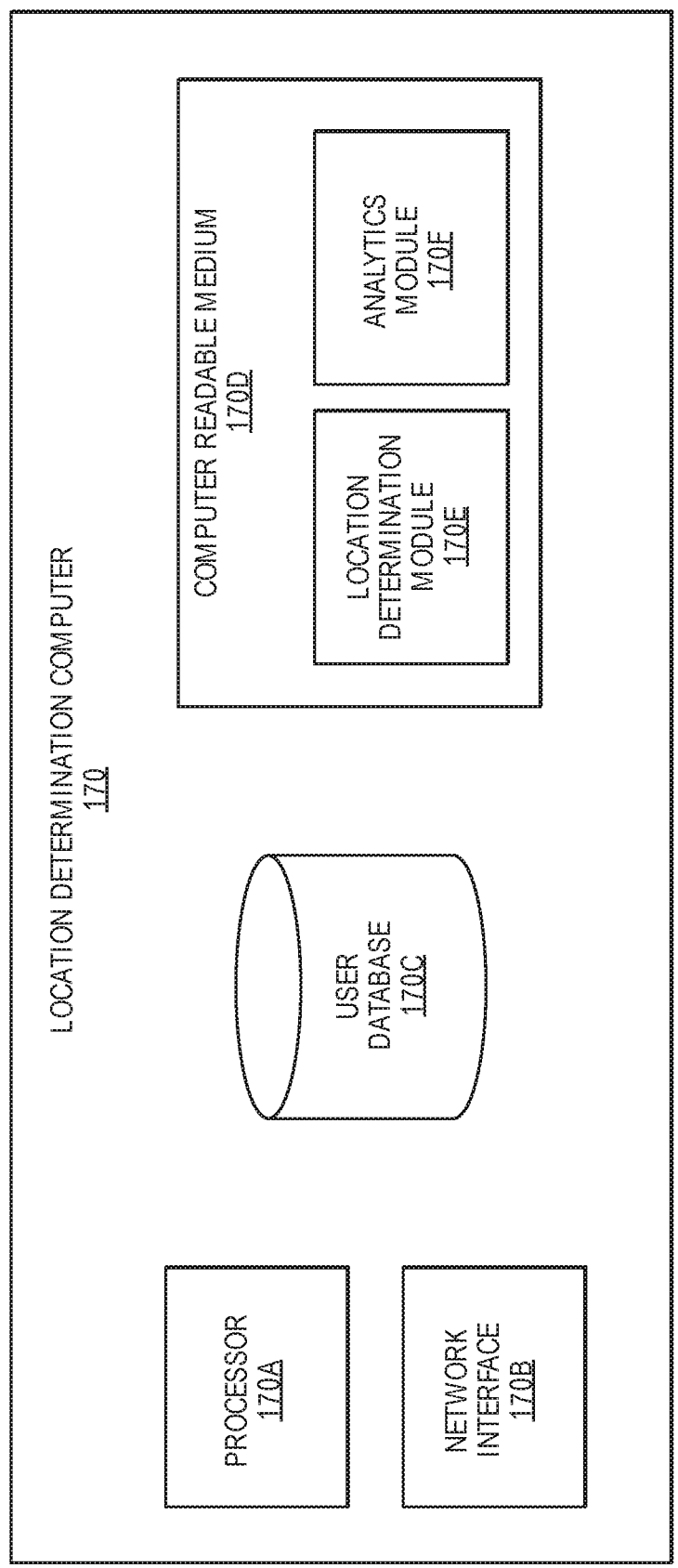
FIG. 3 shows a block diagram of a location determination computer according to an embodiment of the invention.

An example of a location determination computer 170 is shown in FIG. 3. The location determination computer 170 comprises a data processor 170A coupled to a network interface 170B, a user database 170C, and a computer readable medium 170D. The computer readable medium 170D may comprise a location determination module 170E and an analytics module 170F.

The user database 170C may store data relating to users of various mobile communication devices. Such information may include the users' mobile communication device identifiers (e.g., phone numbers) and related account information (e.g., primary account numbers, e-mail addresses, etc.).

The location determination module 170E may be programmed to determine the plurality of pre-defined geographic zones of the mobile communication device from the location data received from the mobile communication device. The location determination module 170E may be also be programmed to receive location data from the mobile communication device, and convert the location data into another data format.

The analytics module 170F may be programmed to perform any analytical process based on the location determinations of the location determination module 170E. Such analytical processes might include any statistical analyses which might indicate where a particular mobile communication device might be located or moved in view of past location data for that mobile communication device. Such analytic processes may also include the determination or creation of a boundary function, the update of the boundary function based upon the movement of the mobile communication device, the determination of a plurality of pre-determined geographic zones that may overlap the boundary function, as well as their identifiers, and/or the comparison of a pre-determined geographic zone for a current transaction to the plurality of pre-determined geographic zones.

In some embodiments, the location determination computer 170 may also comprise or access a database (not shown) that may store the recent locations of the mobile communication device. The mobile communication device may send the location of the mobile communication device to the location determination computer 170 based on a device event (e.g. mobile communication device switches cell towers) and may store the location in the database. Alternately, the location determination computer 170 may periodically request the location of the mobile communication device from the mobile communication device and may store the location in the database. This can make the retrieval of location data easier when transaction data is received by the transaction processing computer.

Figure 4:
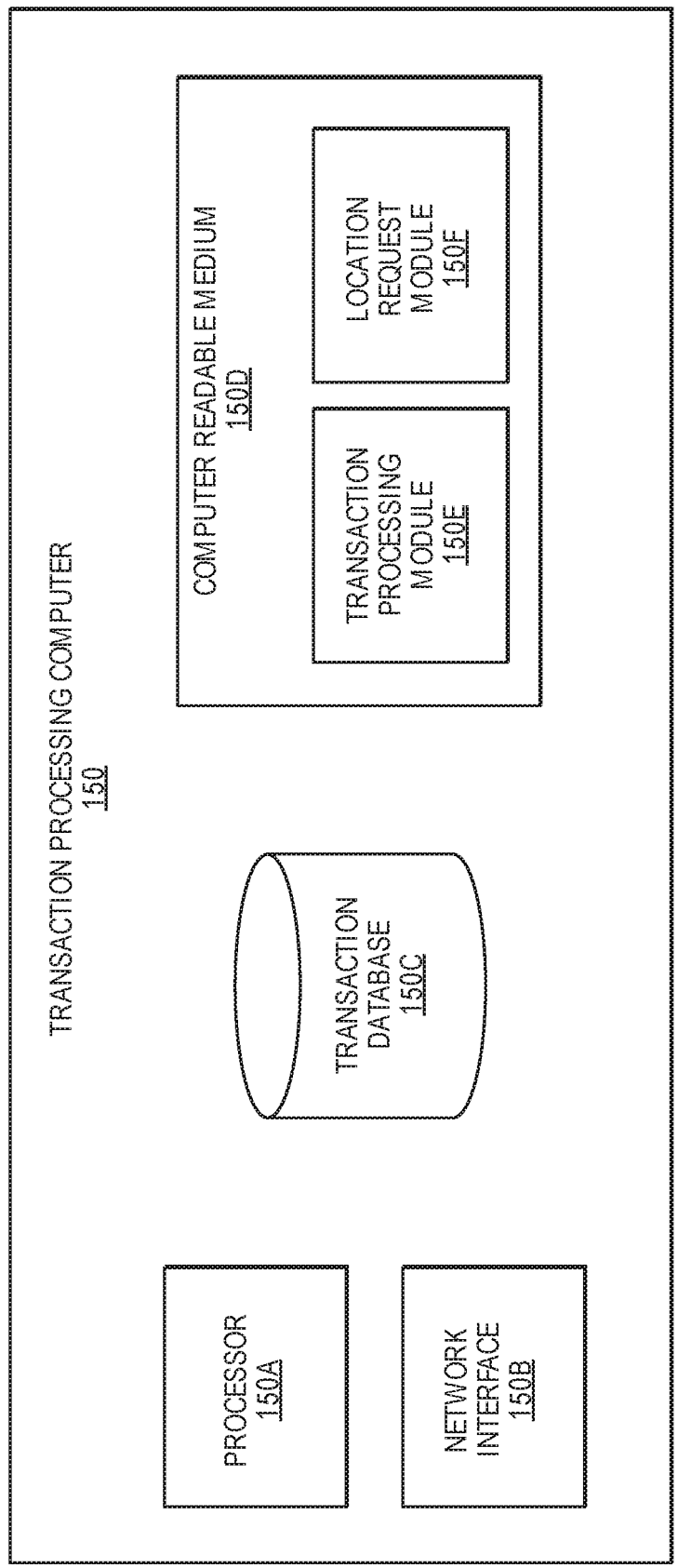
FIG. 4 shows a block diagram of a transaction processing computer according to an embodiment of the invention.

An example of the transaction processing computer 150, according to some embodiments of the invention, is shown in FIG. 4. The transaction processing computer 150 comprises a processor 150A, a network interface 150B, a transaction database 150C, and a computer readable medium 150D.

The computer readable medium 150D may comprise a transaction processing module 150E, a location request module 150F, and any other suitable software module.

The transaction processing module 150E may comprise code that causes the processor 150A to process transactions. For example, the transaction processing module 150E may contain logic that causes the processor 150A to analyze transaction risk, and to forward, authorize, or reject authorization request messages for payment transactions. The transaction processing module 150E may also be able to store transaction records in the transaction database 150C. For example, the transaction database 150C may include a record of each completed transaction that includes transaction details (e.g. items purchased, amount, timestamp), resource provider information, user 110 information (e.g., a name, a phone number and/or other contact information, a payment token, an expiration date, etc.), and/or any other suitable information.

The location request module 150F may comprise code that causes the processor 150A to request the location of particular mobile communication device associated with a particular account number from the location determination computer 170. The request may include transaction data received from an access device, or it may include a pre-determined geographic zone identifier. The request module 150F may also be programmed to cause the transaction processing computer 150 to receive a response to the request.

Figure 5:
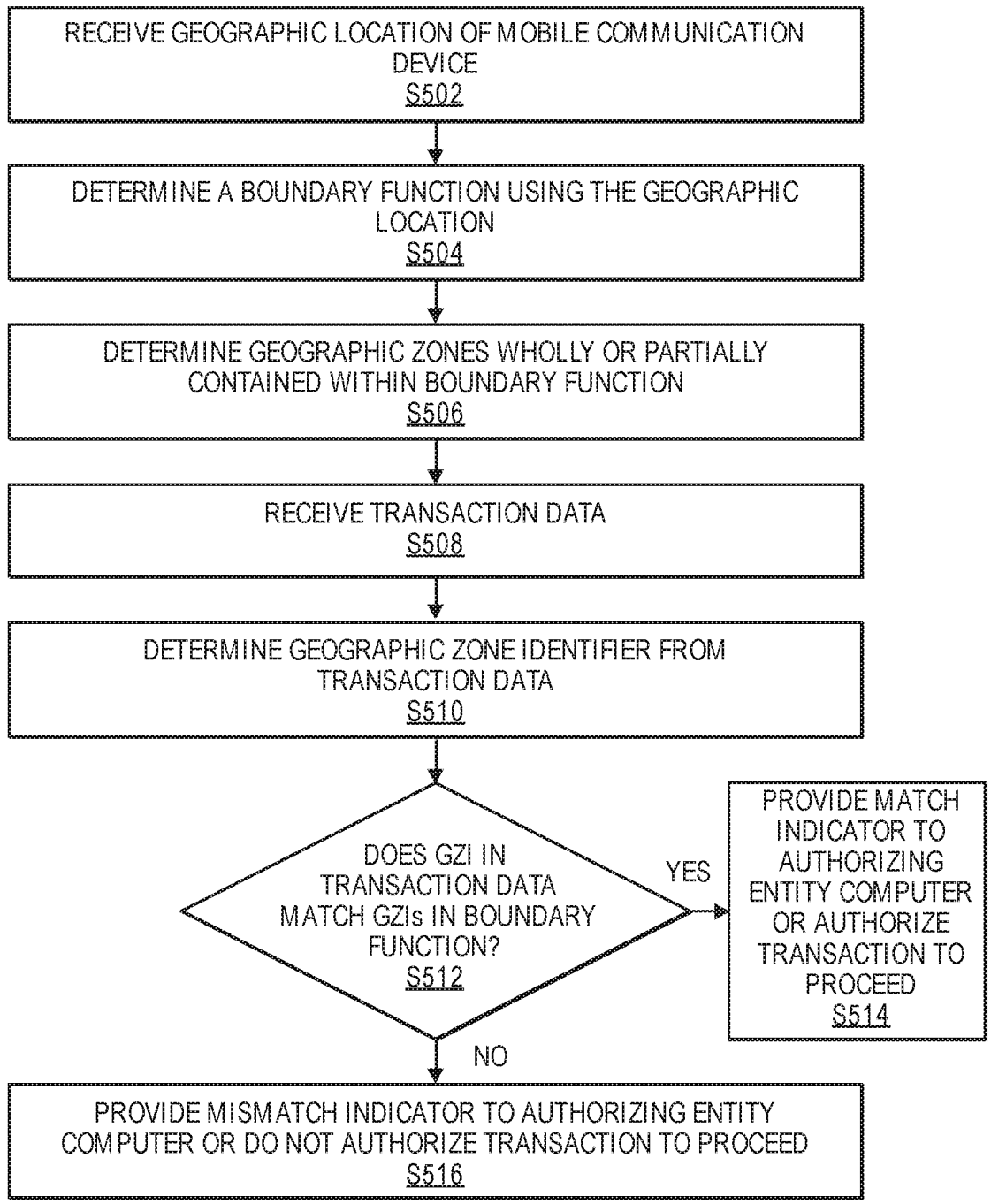
FIG. 5 shows a flowchart illustrating a method according to embodiments of the invention.

A method according to an embodiment of the invention can be described with reference to FIGS. 1, 5 and 6.

Initially, a user 110 may be in possession of the mobile communication device 120 and the portable user device 115. The portable user device 115 may be a payment card such as a credit card. The user 110 may take the portable user device 115 and may cause it to interact with the access device 125.

Before or after this occurs, in step S502, a geographic location of a mobile communication device is determined. This can occur in any number of ways. For example, the mobile communication device 120 may send signals or data (e.g., cell site data, GPS data, etc.) to the location determination computer 170. If the mobile communication device 120 did not send its own specific location, then the location determination computer 170 may then request the location of the mobile communication device 120 or may determine it. The determined location may be expressed in coordinates such as latitude and longitude.

In step S504, a boundary function is determined by the location determination computer 170 using the geographic location. For example, once the latitude and longitude of the users mobile communication device 120 is determined, a circle of a predetermined distance (e.g., 20 miles) may be defined around the location. The latitude and longitude of the users mobile communication device 120 may be a central point or centroid of the boundary function. Although a circle is described for illustration, it may be other shapes in other embodiments of the invention.

In step S506, a plurality of pre-defined geographic zones overlapping the boundary function are determined by the location determination computer 170. The plurality of pre-defined geographic zones are respectively associated with a plurality of pre-defined geographic zone identifiers. For example, as noted above, the boundary function may be a circle and any postal code zones that overlap with (e.g., contacts or is within) the boundary function may be used.

Figure 6:
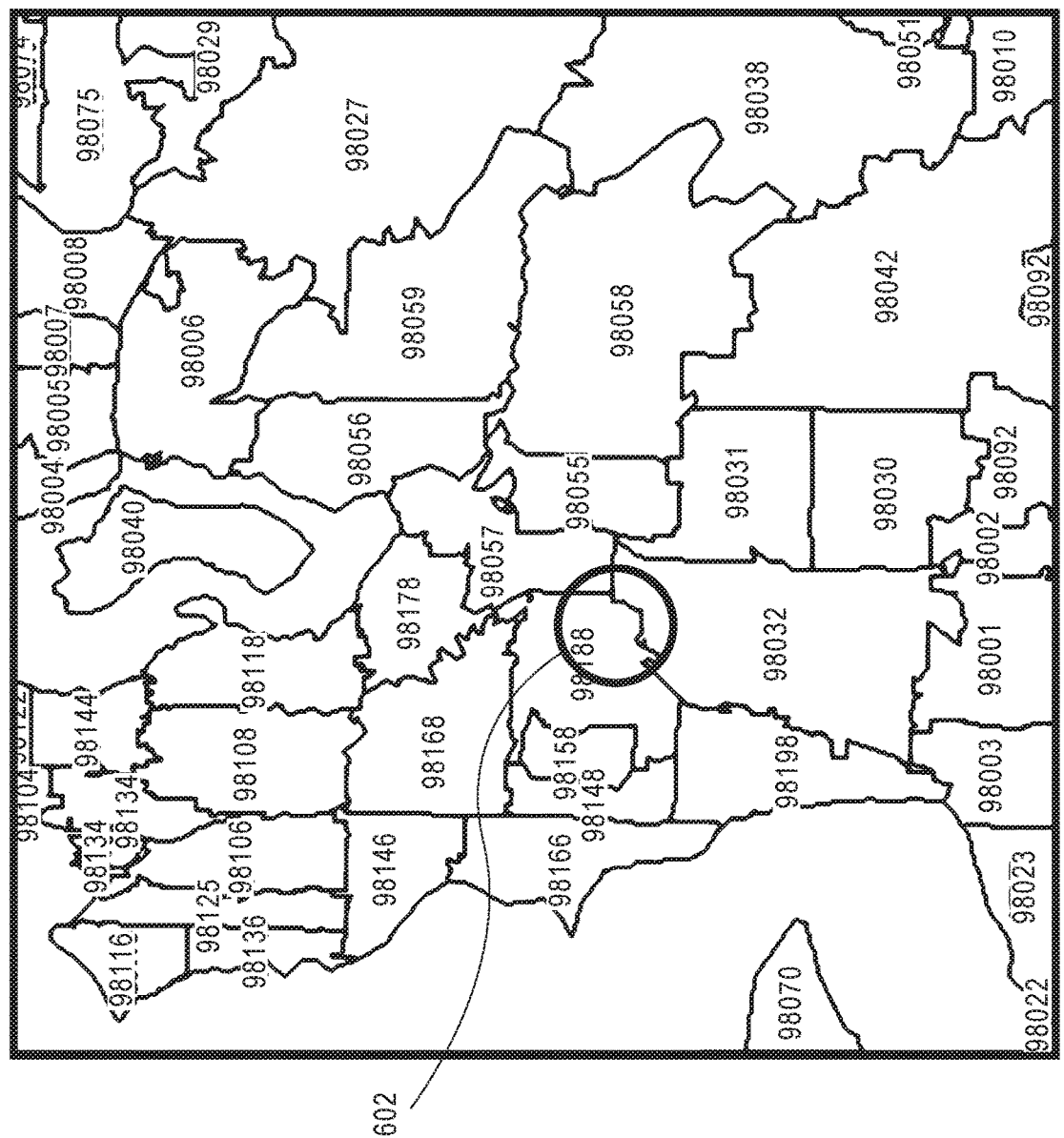
FIG. 6 shows a boundary function overlapping a number of zones associated with a number of postal codes (e.g., zip codes).

With reference to FIG. 6, the boundary function 602 is drawn. The center of the circular boundary function 602 may be the location of the user's mobile communication device 120. Three overlapping zip codes are illustrated: 98057, 98188, and 98032.

Referring back to FIG. 5, in step S508, transaction data is received by the location determination computer 170 and/or the transaction processing computer 150. A pre-defined geographic zone identifier for a pre-defined geographic zone can be determined by the location determination computer 170 and/or the transaction processing computer 150. For example, an authorization request message may be generated by the access device 125 and may be transmitted to the transaction processing computer 150. The transaction data may include the pre-defined geographic zone identifier such as a postal code where the transaction originated. In other embodiments, the transaction data may have other information that may allow the computer to determine the pre-defined geographic zone identifier. For example, the transaction data may include a merchant name, a merchant identifier, an access device number, or a street address. Any of this information could be used to determine a pre-defined geographic zone identifier such as a postal code that corresponds to this information.

In step S510, the location determination computer 170 and/or the transaction processing computer 150 determines if the pre-defined geographic zone matches one of the pre-defined geographic zones in the plurality of pre-defined geographic zones. For example, the location determination computer 170 and/or the transaction processing computer 150 may then compare the postal code in the authorization request message to the three postal codes: 98057, 98188, and 96032 to determine if there is a match.

In step S514, if the answer to this question is "yes," then the authorization process may continue. For example, the transaction processing computer 150 may transmit the authorization request message to the authorizing entity computer 160 for authorization. The authorization request message may be modified to include a flag (an example of a match indicator) that indicates that the users mobile communication device 120 was proximate to the access device 125. Alternatively, the transaction processing computer 150 could simply approve of the transaction and can return an authorization response message back to the access device 125.

In step S514, if the answer to this question is "no," then the transaction may be flagged as suspicious. The transaction processing computer 150 could transmit an authorization response messages back to the access device 125 declining the transaction. Or it may forward the authorization request message to the authorizing entity computer 160 with a flag (an example of a mismatch indicator) indicating that the transaction may be higher risk. It may alternatively update a fraud score with this information and the fraud score may be forwarded to the authorizing entity computer. If the transaction processing computer 150 declines the transaction, it may do so using other information (e.g., additional fraud data indicating that the transaction may be fraudulent).

Although postal codes are described in detail as examples of geographic zone identifiers, in other embodiments, geographic zone identifiers may include the names of cities, states or provinces or countries. For example, in some embodiments, a boundary function can be formed as described above, and any cities that fall within the boundary function can be present in a list that can be compared against a city that is present in an authorization request message that is received from an access device. In some embodiments, the city name may be normalized before it is compared to the list of cities within the boundary function. Normalization can be desirable when different access devices provide the names of cities in different ways (e.g., SF, San Francisco, San Fran, etc.).

Figure 7:
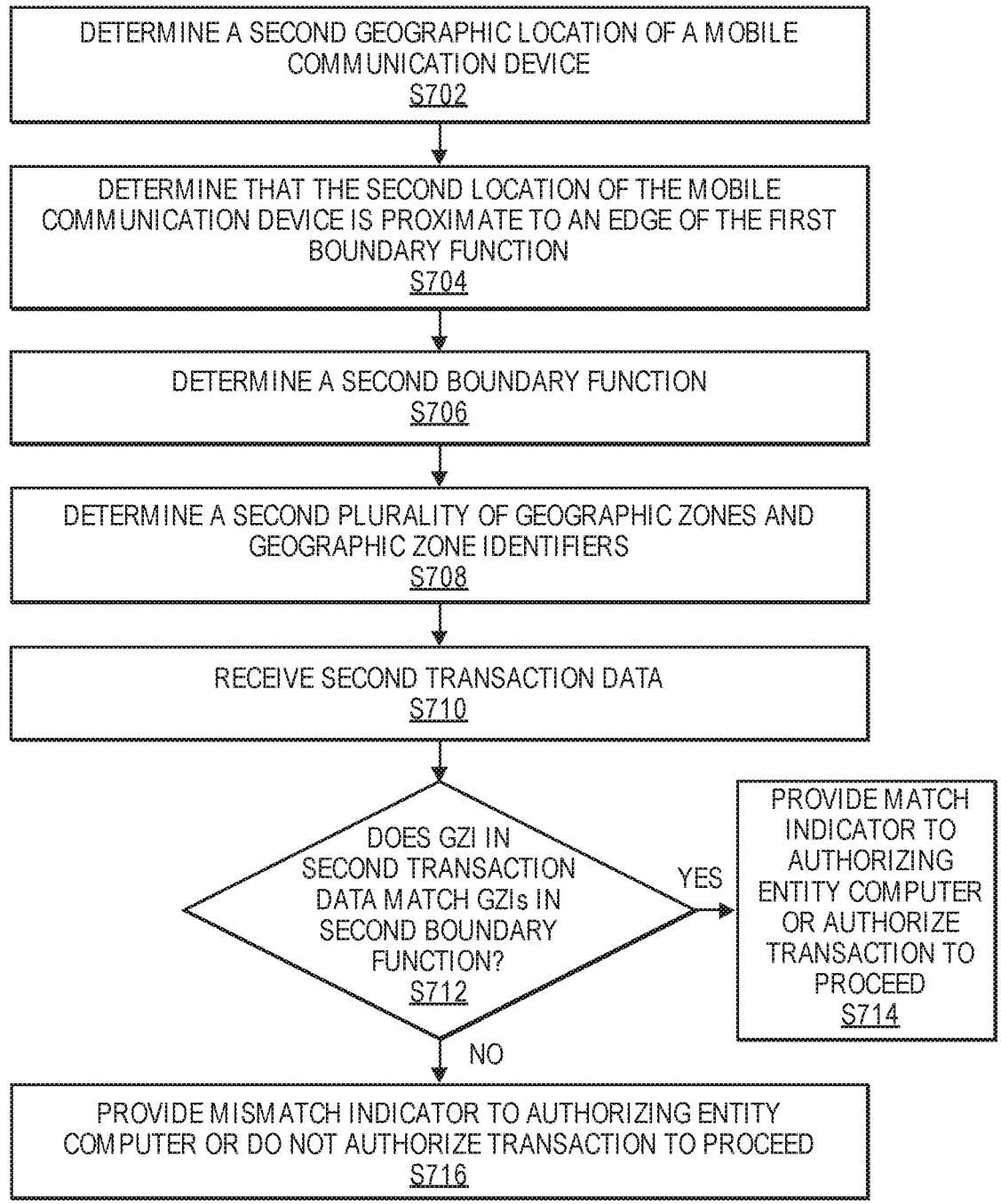
FIG. 7 shows a flowchart illustrating another aspect of a method according to embodiments of the invention.

In some embodiments, the previously described boundary function can be recreated according to the movement and re-location of the mobile communication device. This process can be described with reference to FIGS. 7 and 8.

Figure 8:
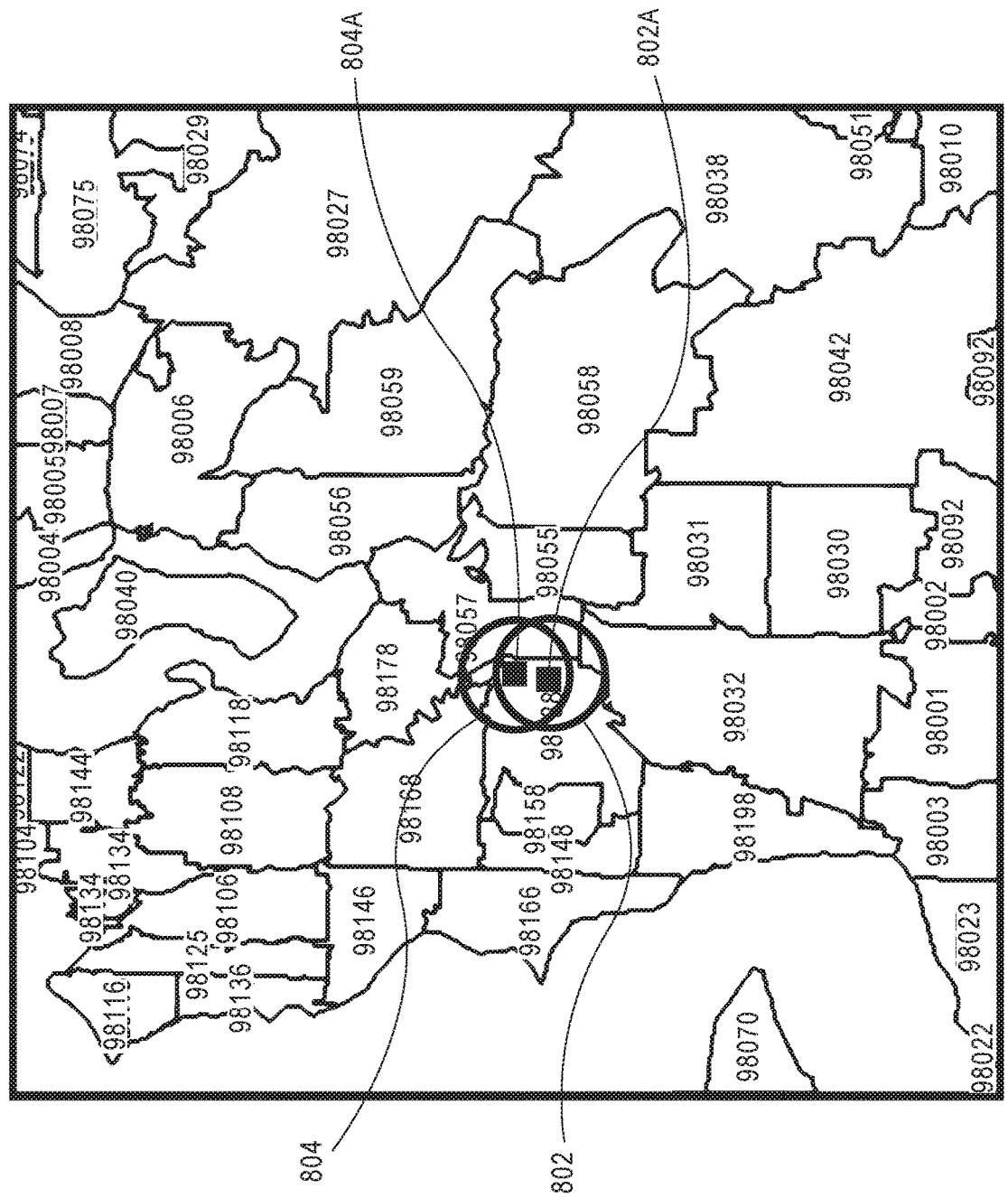
FIG. 8 shows a boundary function overlapping a number of zones associated with a number of postal codes.

FIG. 8 shows a first location of a mobile communication device at 802A and a corresponding first boundary function 802 that corresponds to the location of mobile communication device 802A. At some period in time after being at location 802A, the mobile communication device may move to location 804A, and in step S702 in FIG. 7, the computer may determine a second boundary function of the mobile communication device. Alternatively, the location determination computer may request the current location of the mobile communication device from the mobile communication device.

In some embodiments, in step S704, a second boundary function is created if the second location 804A is at a threshold distance to the previous boundary function 802. For example, the second location 804A may be within 10, 20, or even 30 percent or less, of the distance to the first boundary 802A relative to the first location 802A. For example, if the distance from location 802A to the boundary function 802 is one mile, then a new boundary function may be determined if the mobile communication device moves 0.9 miles toward the boundary function 802. Thus, in step S706, based on the second location 804A of the mobile communication device, a new second boundary function 804 can be created. The same or different methodology may be used to create the first and second boundary functions.

In step S708, once the second boundary function is created, a second plurality of zones and zone identifiers are determined. For example, in FIG. 8, the postal codes 98057, 98188, and 98168 may overlap with the second boundary function 804.

In step S710, second transaction data may be received from a particular access device, in a similar manner as described above with respect to FIG. 5. A second pre-defined geographic zone is determined from the transaction data by the location determination computer 170 and/or the transaction processing computer 150.

In step S712, the location determination computer 170 and/or the transaction processing computer 150 determines if the second pre-defined geographic zone matches one of the pre-defined geographic zones in the second plurality of pre-defined geographic zones. For example, the location determination computer 170 and/or the transaction processing computer 150 may determine a postal code from the received transaction data, and may then compare the postal code in the authorization request message to the three postal codes: 98057, 98188, and 98168 to determine if there is a match.

In step S714, if the answer to this question is "yes," then the authorization process may continue. For example, the transaction processing computer 150 may transmit the authorization request message to the authorizing entity computer 160 for authorization. The authorization request message may be modified to include a flag that indicates that the user's mobile communication device 120 was proximate to the access device 125. Alternatively, the transaction processing computer 150 could simply approve of the transaction and can return an authorization response message back to the access device 125.

In step S716, if the answer to this question is "no," then the transaction may be flagged as suspicious. The transaction processing computer 150 could transmit an authorization response messages back to the access device 125 declining the transaction. Or, it may forward the authorization request message to the authorizing entity computer 160 with a flag (e.g., a mismatch indicator) indicating that the transaction is suspicious. It may alternatively update a fraud score with this information and the fraud score may be forwarded to the authorizing entity computer.

Figure 9:
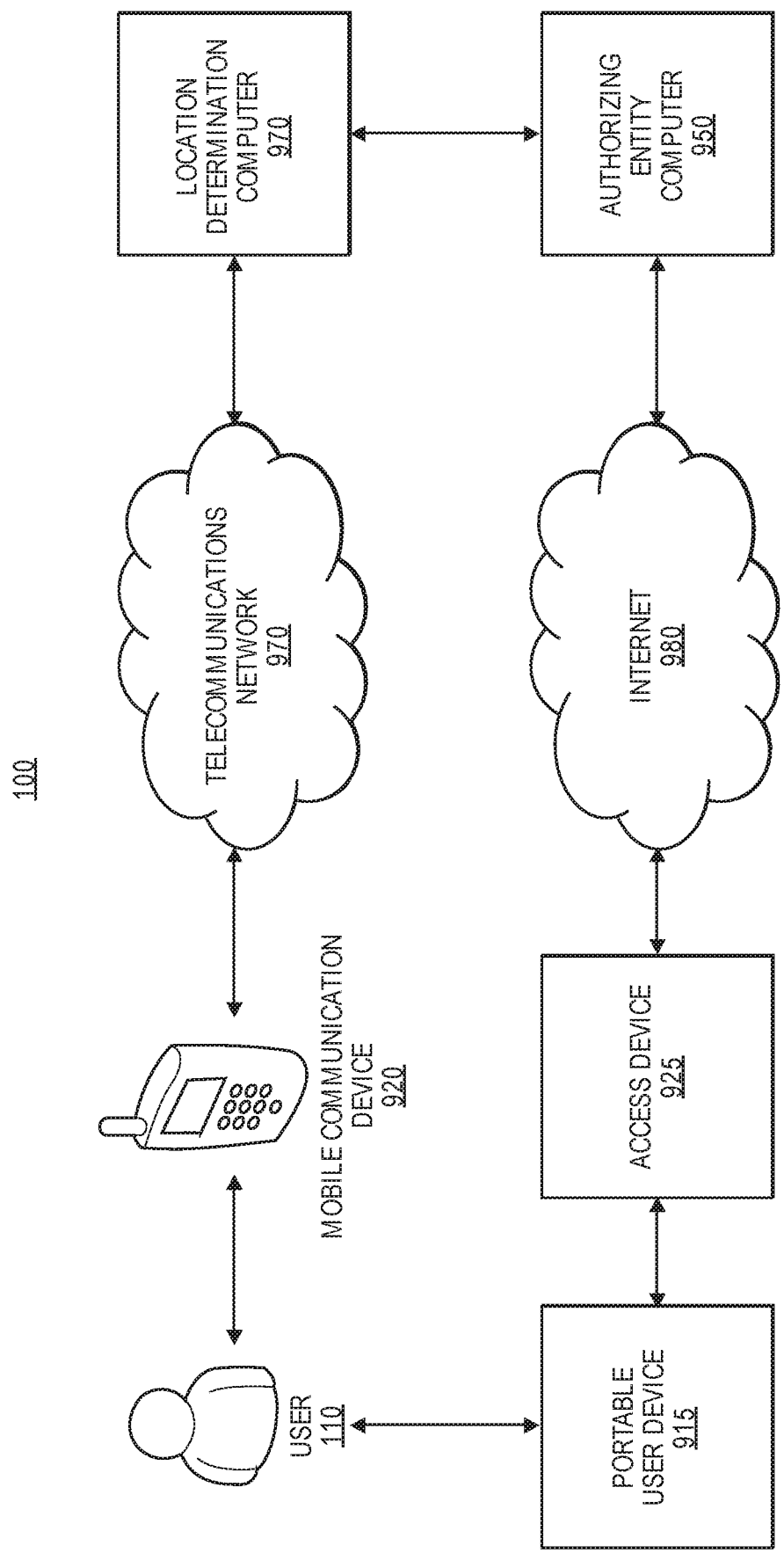
FIG. 9 shows a block diagram of another system according to embodiment of the invention. The system can be used to facilitate accessing data.

FIG. 9 shows a block diagram of a system that can be used for data access. As in the example above with respect to FIG. 1, the mobile communication device 920 of the user 110 may provide location data to a location determination computer via a telecommunications network 970.

In FIG. 9, a user 110 may wish to access data that might be hosted by an authorizing entity computer 950. The user may use a portable user device 915 such as a card, to interface to an access device 925. The access device 925 may communicate with the authorizing entity computer 950 via the Internet 980. In particular, the access device 925 may transmit transaction data to the authorizing entity computer 950. The transaction data may include a pre-defined geographic zone identifier, or it may include information (e.g.; a physical address or an access device ID) that can be used to determine the pre-defined geographic zone identifier.

The authorization entity computer 950 may request the location information of the mobile communication device 920 from the location determination computer 970. The request may include the transaction data or the determined geographic zone identifier associated with the transaction data. The location determination computer 970 may then determine if the pre-defined geographic zone identifier matches any of the identifiers of the pre-defined geographic zones that overlap the determined boundary function that was determined by the location determination computer 907 based on the location of the mobile communication device. If there is a match, then this result may be communicated to the authorizing entity computer 950 and the user 110 may be allowed to receive or access the requested data from the authorizing entity computer 950. If there is no match, then the user may not be allowed to receive the requested data from the authorizing entity computer 950.

Embodiments of the invention have a number of advantages. For example, by utilizing a plurality of normalized geographic zone identifiers and the above-described matching process, the speed and accuracy of determining if a mobile communication device is present at a point of transaction is greater. That is, in a conventional system, an access device and a mobile communication device may transmit location information to a central computer in different formats, making any comparison of location data difficult. Embodiments of the invention simplify conventional systems while also providing more accuracy.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   a) determining, by a computer, a geographic location of a mobile communication device;
   b) determining, by the computer, a boundary using the geographic location of the mobile communication device, wherein the geographic location is at a center of the boundary;
   c) determining, by the computer, a plurality of pre-defined geographic zones overlapping the boundary, the plurality of pre-defined geographic zones are respectively associated with a plurality of postal codes;
   d) receiving, by the computer, transaction data for a transaction from an access device, and determining a postal code associated with the access device;
   e) determining, by the computer, that the postal code associated with the access device matches one of the postal codes in the plurality of postal codes overlapping the boundary; and
   f) in response to step e), providing a match indicator to an authorizing entity computer or authorizing the transaction to proceed.

2. The method of claim 1, wherein the postal code associated with the access device is present in an authorization request message from the access device.

3. The method of claim 1, wherein the boundary is a circle or polygon and the geographic location comprises a latitude value and longitude value.

4. The method of claim 1, wherein the geographic location of the mobile communication device is a first geographic location, wherein the postal codes are a first plurality of postal codes, and wherein the boundary is a first boundary, and wherein the method further comprises:
   determining, by the computer, a second geographic location of the mobile communication device;

determining, by the computer, that the second geographic location of the mobile communication device is proximate to an edge of the boundary;

determining, by the computer, a second boundary using the second geographic location; and determining, by the computer, a second plurality of pre-defined geographic zones overlapping the second boundary, the second plurality of pre-defined geographic zones respectively associated with a second plurality of postal codes, and wherein the first plurality of postal codes is different than the second plurality of postal codes.

5. The method of claim 4, wherein the access device is a first access device, wherein the match indicator is a first match indicator, wherein the transaction is a first transaction, the transaction data is first transaction data, the postal code is a first postal code, and wherein the method further comprises:

receiving, by the computer, second transaction data for a second transaction and determining a second postal code associated with a second access device;

determining, by the computer, that the second postal code associated with the second access device matches one of the postal codes in the second plurality of postal codes; and in response to the determination, providing a second match indicator to the authorizing entity computer or authorizing the second transaction to proceed.

6. The method of claim 1, wherein the transaction is one in which the computer seeks to access data provided by the authorizing entity computer.

7. The method of claim 1, wherein the postal code associated with the access device is in the transaction data from the access device.

8. A computer comprising:

a processor; and a non-transitory computer readable medium, the non-transitory computer readable medium comprising code, executable by the processor, for implementing a method comprising:

a) determining a geographic location of a mobile communication device;

b) determining a boundary using the geographic location, wherein the geographic location is at a center of the boundary;

c) determining, by the computer, a plurality of pre-defined geographic zones overlapping the boundary, the plurality of pre-defined geographic zones are respectively associated with a plurality of postal codes;

d) receiving transaction data for a transaction from an access device and determining a postal code associated with the access device;

e) determining that the postal code associated with the access device matches one of the postal codes in the plurality of postal codes; and f) in response to step e), providing a match indicator to an authorizing entity computer system or authorizing the transaction.

9. The computer of claim 8, wherein the postal code associated with the access device is present in an authorization request message from the access device.

10. The computer of claim 8 wherein the boundary is a circle or polygon, and the geographic location comprises a latitude value and longitude value.

11. The computer of claim 8, wherein the boundary is a circle and the geographic location comprises a latitude value and longitude value.

12. The computer of claim 8, wherein the method further comprises:

wherein the geographic location of the mobile communication device is a first geographic location, wherein the plurality of postal codes is a first plurality of postal codes, and wherein the boundary is a first boundary, and wherein the method further comprises:

determining a second geographic location of the mobile communication device;

determining that the second geographic location of the mobile communication device is proximate to an edge of the boundary; and determining a second boundary using the second geographic location.

13. The computer of claim 8, wherein the transaction is one in which the computer seeks to access data provided by the authorizing entity computer system.

14. The computer of claim 8, wherein the mobile communication device is a mobile phone.

15. A method comprising:

transmitting, by a mobile communication device operated by a user, data representing a geographic location of the mobile communication device to a computer, the computer determining a boundary using the geographic location, wherein the geographic location is at a center of the boundary, and determining a plurality of pre-defined geographic zones overlapping the boundary, the plurality of pre-defined geographic zones respectively associated with a plurality of postal codes; and interacting, a portable user device, with an access device in a transaction, wherein the access device generates and transmits an authorization request message comprising transaction data to the computer, the computer determining a postal code associated with the access device, and wherein the computer determines that the postal code associated with the access device matches one of the plurality of postal codes, and provides a match indicator to an authorization system, or authorizes the transaction to proceed.

16. The method of claim 15, wherein the access device is a personal computer, and the transaction is one which can allow the user to access data.

17. The method of claim 15, wherein the data representing the geographic location comprises a latitude and longitude of the mobile communication device.

18. The method of claim 15, wherein the portable user device and the access device interact using a short range wireless communication protocol.

* * * * *